United States Patent

[11] 3,627,357

[72] Inventor Forest E. Sanders
Box 206, Green City, Mo. 63545
[21] Appl. No. 868,519
[22] Filed Oct. 22, 1969
[45] Patented Dec. 14, 1971

[54] PIPE CONNECTOR FITTING
14 Claims, 13 Drawing Figs.

[52] U.S. Cl. .................................................. 285/174,
285/328, 285/177, 285/343, 285/354, 285/368,
285/383
[51] Int. Cl. ........................................................ F16l 55/00
[50] Field of Search ............................................. 285/368,
337, 174, 354, 350, 31, 328, 177, 346, 343, 364,
383

[56] References Cited
UNITED STATES PATENTS
2,286,566  6/1942  Norton .......................... 285/337 X
2,376,017  5/1945  Smallpeice .................... 285/368 X
3,396,995  8/1968  Burnside ....................... 285/354 X
FOREIGN PATENTS
1,187,433  2/1965  Germany ....................... 285/368
651,118  10/1962  Canada ......................... 285/368
1,280,054  11/1961  France .......................... 285/368
1,348,409  12/1963  France .......................... 285/343
626,545  10/1961  Italy ............................. 285/343

Primary Examiner—Dave W. Arola
Attorney—Morton S. Adler

ABSTRACT: A pipe connector fitting for joining two sections of pipe in axial alignment where neither of the joinable ends of the pipe sections have fixed end flanges or where only one of the sections has a fixed end flange on the joinable end and including replacement of a section in a pipeline where the sections to which the replacement is to be attached may be rigidly anchored. The pipes connected may be metal or plastic or metal to plastic. A compressible gasket-and-flange-type compression ring are mounted on the joinable end of a pipe section having no fixed end flange. The gasket and compression ring have abutting tapered surfaces with the gasket projecting slightly beyond the face of the compression ring. Where one section has a fixed flange, the ring is joinable to such flange so that the gasket is tightened into sealing engagement with the exterior of the joined pipe and with the flange and ring. With no fixed flanges on the joinable pipe sections, a like compression ring and gasket are provided on the opposed joinable pipe ends with a spacer washer or wafer intermediate such ends so that the respective gaskets are compressed into sealing engagement against the pipe and against opposite faces of the washer. A stepped shaped spacer washer is provided for joining pipes of different diameters.

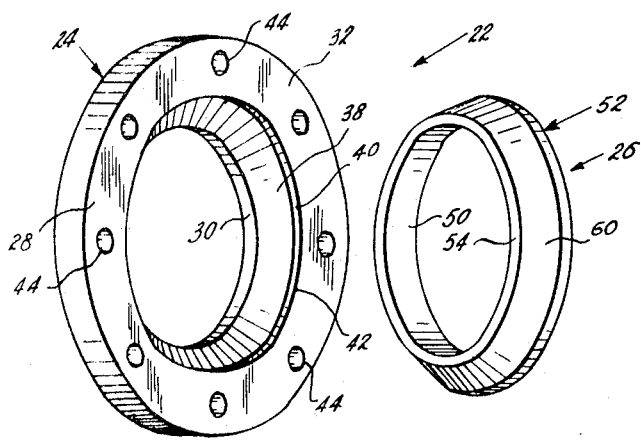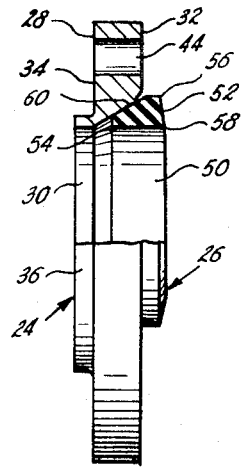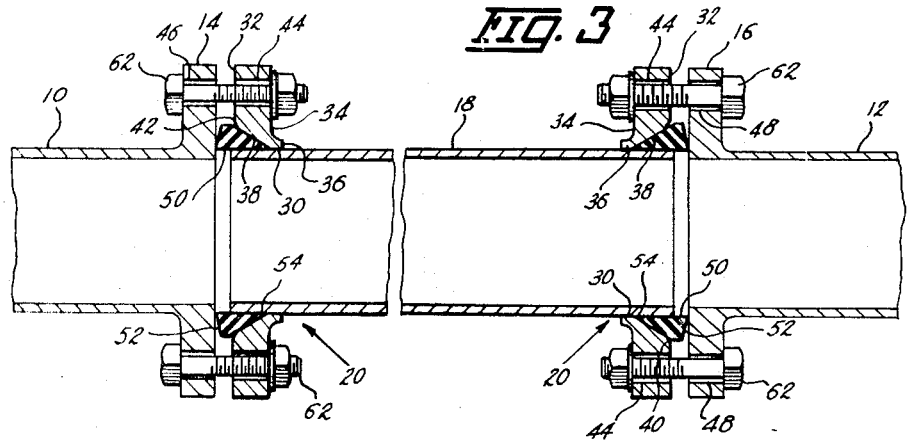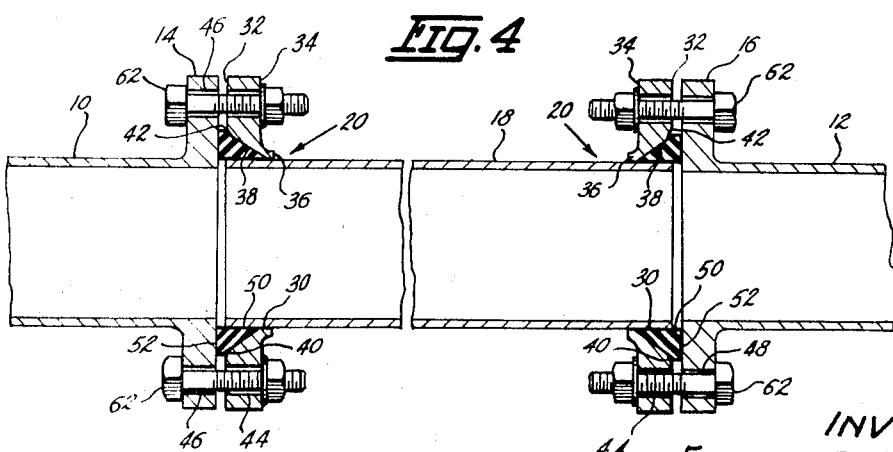

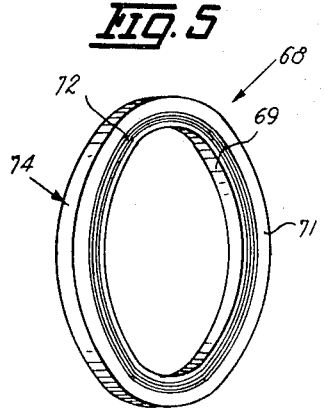
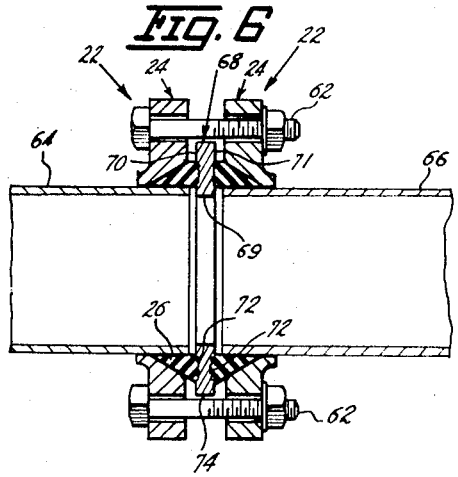
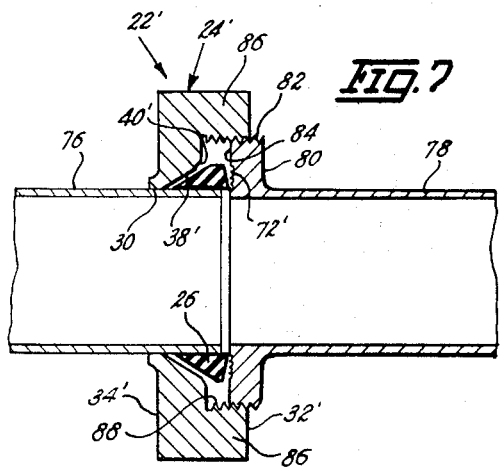
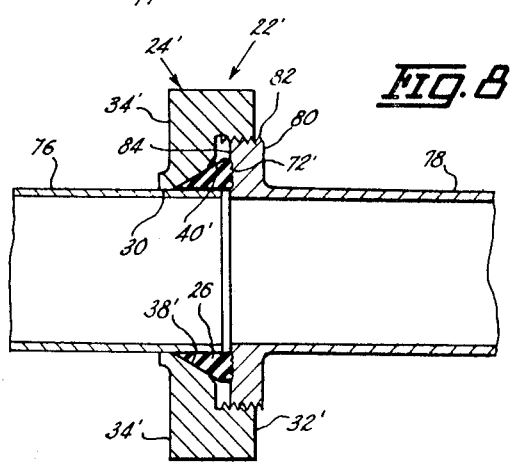
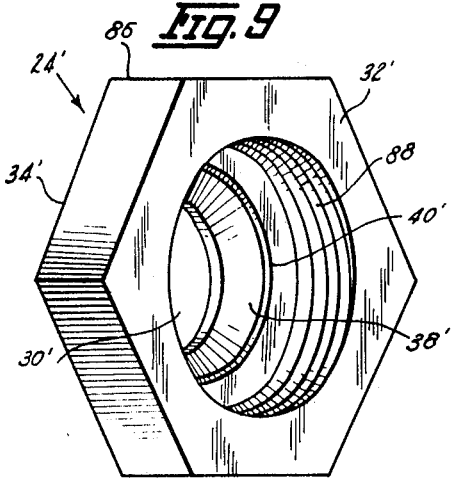
INVENTOR.
FOREST E. SANDERS

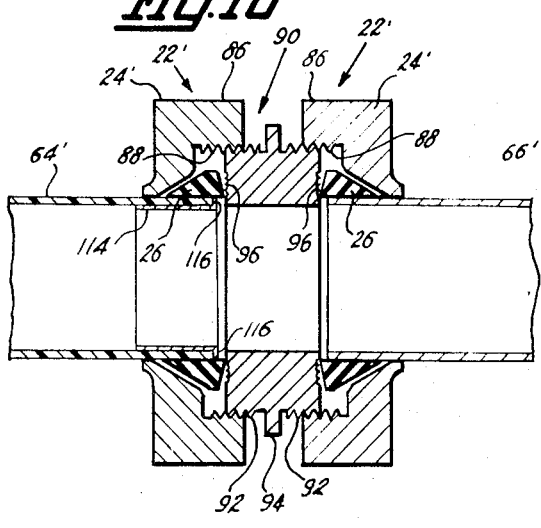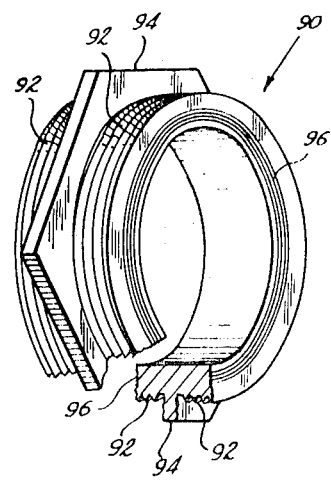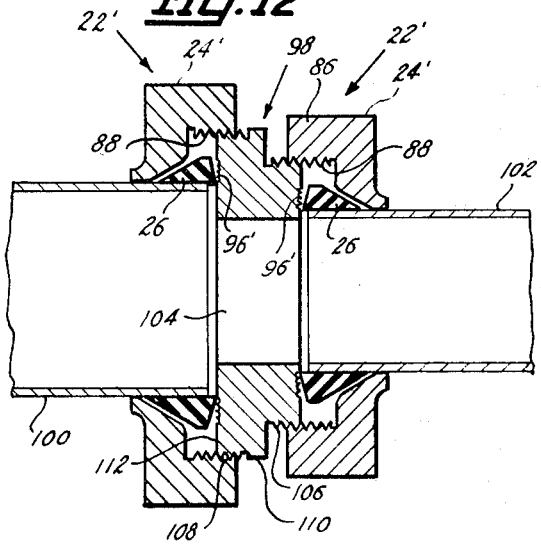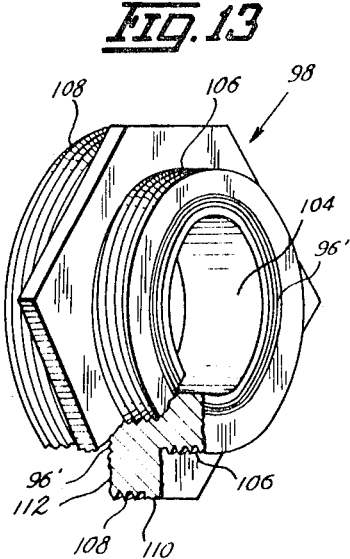

PIPE CONNECTOR FITTING

BACKGROUND OF THE INVENTION

1. Field of the Invention

This invention relates to an improved pipe connector fitting which can be adapted to join two pipe sections of the same or different diameters, in axial alignment either in the initial construction of the pipeline or for purposes of replacing a pipe section and has special utility for replacing a pipe section where the pipeline is rigidly anchored since the replacement of such a section can be accomplished without disturbing the anchor points of the pipeline.

2. Description of the Prior Art

In certain pipeline construction, the pipe sections are provided with fixed flanges which are joinable to like flanges on successive sections. The length of such sections may vary and may include only ordinary pipe lengths or may have certain valve structures mounted in such sections. Also, at times, there may be a requirement for certain random lengths and this generally requires ordering special sections with appropriate flanged ends to meet these requirements. Not infrequently after the assembly of the sections, such pipelines are rigidly anchored as, for example, through walls of building structures, and in such cases and particularly with large and heavy pipes, if it becomes necessary to replace a pipe section, which may include a valve unit, it is extremely difficult, if not impossible, to replace the section with the main line rigidly anchored due to the lack of maneuverability for gasket or packing clearance. As a result, replacement of a new section generally requires tearing down the line and reconstructing it.

A variety of pipe connecting fittings have been devised to facilitate the joining of pipe ends and generally these include or require that at least one of the joinable ends have an integral end flange. U.S. Pat. Nos. 2,831,708 and 3,179,449 illustrate pipe fitting units wherein at least one of the joinable flanges are not integrally attached to a pipe section but these are either intricate assemblies or limited to specific purposes considerably different from the present invention which proposes a simple but efficient connector fitting that can be conveniently used to join opposed ends of pipe sections having no fixed end flanges or can be used to replace a section between two respective pipe sections having fixed end flanges. Another characteristic of this invention is that it can be adapted for joining pipes of different diameters.

SUMMARY

The present invention is designed to join two pipe sections in axial alignment either under the circumstances where neither of the joinable ends has an integral end flange or where only one of such joinable ends will have a fixed end flange. This fitting is further adapted to permit the insertion of random lengths of pipe in a pipeline where the same may be required and to facilitate and expedite the joining of pipe sections either in the initial construction of a pipeline or for replacing a pipe section in a line which may be rigidly anchored as, for example, in a concrete wall of a building structure or the like and without in any way disturbing the main line at any of its anchor points. This fitting is further suitable for joining piping of metal to metal, plastic to plastic or metal to plastic.

In joining two pipe sections having no end flanges, a compression flange type ring is slip-fitted over each end of the joinable pipe sections together with a similarly arranged compression gasket. Each gasket has a tapered peripheral surface oriented toward the compression ring for seating against a complementary tapered surface on such ring and each of the rings are provided with registering bolt holes. The gasket is mounted so as to project slightly beyond the face of the compression ring and with a spacer washer member having an inner diameter the same as the pipe and an outer diameter larger than the pipe so as to extend radially therefrom and disposed intermediate the gaskets, the two compression rings can be joined by suitable bolts so that as the rings are drawn toward each other, the respective gaskets are compressed against the outer surface of the respective pipes and against the opposed faces of the radially projecting portion of the intermediate spacer washer so that an effective fluid seal is accomplished. Modified forms of the compression rings and fixed flanges may be utilized to secure this fitting by threadable means in place of bolt and nuts. If the pipes to be joined are of different diameters, rings and gaskets of appropriate different diameters are used and a modified spacer fitting is provided to accommodate the necessary different diameter ring and gasket assemblies.

Where only one of the pipe sections has an integral end flange, a compression ring and gasket are mounted on the end of a pipe having no flange and the ring is suitably secured to the fixed flange as indicated above.

BRIEF DESCRIPTION OF THE DRAWINGS

FIG. 1 is an exploded perspective view showing one form of the compression ring and gasket used in this invention, FIG. 2 is a side view, partly in section, showing the ring and gasket of FIG. 1 in assembled position relative to each other, FIG. 3 is a side view, partly in section, showing the ring and gasket of FIG. 1 on opposite ends of a pipe section having no fixed flanges and which is fitted between spaced fixed flanges in a pipeline and prior to the tightening of the rings to the flanges, FIG. 4 is a view similar to FIG. 3 and showing the rings tightened on the gasket and to the flanges to secure the intermediate pipe section in fluidtight alignment with the pipeline, FIG. 5 is a perspective view of a spacer washer or wafer used in one embodiment of this invention, FIG. 6 is a sectional view showing this invention utilizing the washer of FIG. 5 to join two pipe ends which have no fixed end flanges, FIG. 7 is a sectional view showing another embodiment of this invention for joining a pipe section with no fixed flange to the fixed flange on the other pipe, and more particularly a modified form of the compression ring and the fixed flange, FIG. 8 is a view similar to FIG. 7 but showing the pipe ends securely joined, FIG. 9 is a perspective view of the compression ring shown in FIGS. 7 and 8, FIG. 10 is a sectional view showing a further embodiment of this invention for joining pipe ends having no fixed flanges as in FIG. 6 but utilizing the compression ring and gasket of FIGS. 7–8 together with a modified spacer fitting, FIG. 11 is a perspective view, partly cut away, of the spacer fitting shown in FIG. 10, FIG. 12 is a sectional view showing a modification of FIG. 10 for joining two pipes of different diameters, and FIG. 13 is a perspective view partly cut away of the spacer fitting shown in FIG. 12.

DESCRIPTION OF THE PREFERRED EMBODIMENTS

Referring first to FIGS. 3 and 4 of the drawings to show one of the principal uses of this invention, there is shown the axially spaced pipeline sections 10 and 12 of like diameter with the respective integral and fixed flanges 14 and 16 together with the intermediate and axially aligned like diameter pipe section 18. Sections 10 and 12 represent portions of a pipeline to which an intermediate section such as pipe 18 is to be attached either in the initial construction of the line or as a replacement if sections 10 and 12 are already installed and which may under some conditions be rigidly anchored as, for example, in a building wall (not shown).

Pipe 18, which may include a valve unit (not shown), if desired, is provided with relatively smooth end portions 20 and has no comparable fixed flange as members 14 and 16 on pipes 10 and 12. Consequently, pipe 18 may be cut on the job to any random length that may be required in addition to standard lengths and thus no special orders for special lengths are necessary. The attachment of section 18 to pipes 10 and 12 is accomplished by my new and improved pipe connector fitting designated generally by the numeral 22 as seen in FIG. 1 which includes the flangelike compression ring 24 and the compressible ring gasket 26.

The body 28 of ring 24 defines a central opening 30 which has a diameter to permit of a snug slip-fit over end 20 of pipe 18 and, for purposed of description, body 28 is provided with a front face 32 and a rear face 34. Projecting slightly from the rear face 34 is the short collar portion 36 coaxial with opening 30 that engages the surface 20 of pipe 18 as best seen in FIGS. 3 and 4. From the inner edge of collar 36, the inner surface of body 28 is tapered or bevelled as at 38 outwardly to the front face 32 where the outer edge is champfered as at 40 to define the perimeter 42. Ring body 28 is provided with a plurality of spaced openings 44 which correspond to like openings 46 and 48 in the respective permanent flanges 14 and 16 on pipes 10 and 12.

The gasket 26, which is preferably of rubber or other like compressible material suitable for a fluid seal use, has the central through opening 50 of appropriate diameter for a snug slip-fit over the end portion 20 of pipe 18 and for the purposes of description, includes the front face 52 and rear face 54. Face 52 is slightly tapered toward face 54 so that the outer diameter point 56 of face 52 is offset toward face 54 from a vertical line intersecting the inner diameter point 58 on face 52 as best seen in FIG. 2. The outer diameter of gasket 26 at the rear face 54 is less than the outer diameter at the front face 52 to define the bevelled or tapered peripheral edge as at 60. Thus, with gasket 26 mounted to end 20 of pipe 18 together with the mounting of ring 24 as described, the tapered face 38 on ring 24 and the tapered surface 60 of gasket 26 will abut each other as shown. In this position, the interior surface of gasket 26 defining the opening 50 will be engaged with surface 20 of pipe 18 and the front face 52 of gasket 26 will slightly extend or protrude beyond the front face 32 of body 28.

It will be understood that a like assembly 22 of ring 24 in gasket 26 can be conveniently arranged on each end of pipe 18 and that the length of pipe 18 can be somewhat shorter than the distance between the flanges 14 and 16 for purposes of installing pipe 18 since it is not required that the joinable ends of pipe 18 be in abutting registration with the joinable ends of pipes 10 and 12. Such an arrangement affords satisfactory maneuverability of pipe 18 in the event that pipe sections 10 and 12 are rigidly anchored although it will be appreciated that even in those situations where pipes 10 and 12 are not rigidly anchored, the lack of the necessity for an exact dimension of pipe 18 considerably facilitates the mounting of such section.

With pipe section 18 arranged with the assemblies 22 on each end as described, the respective ring 24 can be attached to the flanges 14 and 16 by the customary bolt and nut units 62 whereby as rings 24 are drawn tight to the fixed flanges 14 and 16, surface 38 on ring 24 acts against surface 60 on gasket 26 to effect a fluidtight seal of such gasket to pipe 18 and at the same time, face 52 of gasket 26 is forced into a fluidtight seal with flanges 14 and 16. In the tightening of rings 24 to the flanges 14 and 16, the champfer 40 on ring 24 prevents any cutting of the gasket 26 as the gasket is being compressed. Also, by reason of the taper on the front face 52 of gasket 26 between points 56 and 58, the forwardmost point of such face at point 58 will first come into engagement with the respective flanges 14 or 16 as the ring 24 is being tightened to such flange so that as the tightening continues, and the remaining portion of face 52 is urged into engagement with the opposing flange, the effect of the tapered face 38 on ring 24 acting against the tapered edge 60 of the gasket 26 is to increase the fluid seal contact of the gasket on the outer surface of pipe 18 and against the flange. Thus, as ring 24 is tightened to one of the flanges 14 or 16, it exerts a downwardly and forwardly pressure around the circumference of the gasket 26 to make a more effective seal connection. It is also pointed out that in this tightening operation, gasket 26 is in effect first compressed and then cold flows into contact with the opposing flange. By reason of this action by gasket 26 in being cold flowed into sealing position as described, it is immaterial in the mounting of such gasket that it project beyond the joinable end of pipe 18 and it is sufficient if it is substantially planar therewith as the tightening of ring 24 will cause the gasket 26 to cover any gap between the joinable ends of pipes 10 and 12 and pipe 18. In this regard, if the length of pipe 18 should result in a slightly larger gap than desired, the gasket 26 can be installed to protrude beyond the joinable end of pipe 18 and compensate therefore.

With reference now to FIG. 6, I have shown a second form of use for assemblies 22 relative to the joining of two sections of pipes 64 and 66 which do not have fixed flange ends comparable to the flanges 14 and 16 of FIGS. 3 and 4. Assemblies 22 in this embodiment are constructed the same as disclosed in FIG. 1 so that like numerals are given to like parts. Thus, as seen in FIG. 6, one assembly 22 is appropriately mounted on the respective ends of pipes 64 and 66 which are to be joined in axial alignment. However, associated with this embodiment is the spacer washerlike member or wafer 68 of any suitable hard material. Member 68 is provided with the central opening 69 of the same diameter as pipes 64 and 66 and is disposed intermediate the joinable ends of such pipes as seen in FIG. 6. The opposed side faces 70 and 71 of member 68 are provided with a plurality of concentrically spaced grooves 72 arranged as seen in FIG. 5 so that when such member is disposed between the joinable pipe ends of pipes 64 and 66, the grooves 72 will be in registration with the front faces 52 of the respective gaskets 26. The outer diameter 74 of member 68 is larger than the outer diameter of pipes 64 and 66 so as to project radially therefrom in defining the opposed faces 70 and 71 and also when member 68 is disposed as shown in FIG. 6, the perimeter of such member will be closely adjacent the securing bolts 62 so that for all practical purposes, any radial movement of member 68 relative to pipes 64 and 66 is prevented and such member is effectively locked in place in axial alignment with such pipes.

As the rings 24 are tightened together by the bolt and nut units 62, the front faces 52 of the gaskets 26 will be tightened into sealing engagement with the pipe 64 and the respective opposed faces 70 and 71 of member 68. As this tightening effect is accomplished, the gaskets 26 will be first compressed and then will cold flow into the respective grooves 72 as seen in FIG. 6 to increase the sealing effect of this connector fitting. By reason of member 68, it will be appreciated that the seal afforded by gaskets 26 will always be appropriately positioned relative to the joinable ends of pipes 64 and 66 since assemblies 22 cannot move longitudinally relative to pipes 64 and 66 because of the presence of the member 68.

With reference now to FIGS. 7–9, I have shown another embodiment of my pipe connector fitting. The gasket used in this embodiment is the same as gasket 26 and like numerals will thus be given to like parts thereon. The compression ring is only slightly modified as will appear and like parts are given like numerals primed relative to the previous description of ring 24. In this embodiment, the pipe section 76 to be joined has no fixed flange so that it is similar to pipes 18, 64 and 66 and the connector fitting 22' in this embodiment is used to join pipe 76 to the pipe section 78 which has a fixed flange 80 similarly arranged relative to the fixed flanges 14 and 16. However, flange 80, rather than being provided with bolt holes as in flanges 14 and 16, is shown here as having a threaded circumference 82 to be engaged by the compression ring 24' and the front face 84 of such flange is provided with a plurality of concentrically spaced grooves 72' similar to grooves 72 previously described relative to washer 68. The pipe and gasket engaging portions of ring 24' are similar in construction to ring 24 so that like parts are given like numerals primed as indicated. Ring 24', however, is somewhat wider than ring 24 and at the champfer point 40', the central opening 30' is concentrically enlarged so as to provide the annular coaxial neck 86 having an interior threaded surface 88 of an appropriate diameter for threadable engagement with the threaded surface 82 on flange 80 and an exterior surface that is preferably hex-shaped or the like to which a suitable tightening tool can be applied. By this arrangement, ring 24' and gasket 26 can be mounted to pipe 76 in the same manner as previously described and ring 24' can be joined to flange 80 as shown in FIGS. 7 and 8.

Reference is now made to FIG. 10 where I show another form of this invention used for joining two pipe sections which have no fixed end flanges and to this extent is a modified connector fitting of the type shown in FIG. 6. The fitting in FIG. 10 utilizes the compression ring and gasket as shown and described relative to FIGS. 7 and 8 and will, accordingly, be given like numerals. The pipes which are joined by the fitting in FIG. 10 are of the type shown in FIG. 6 and will be given like numerals primed.

The pipe connector fitting 22', including the compression ring 24' and gasket 26, is mounted to the respective joinable ends of pipes 64' and 66' in the same manner as previously described for such fitting relative to pipe 76 in FIG. 7. A spacer member 90 similarly located as but a modification of the spacer member 68 in FIG. 6, is best seen in FIG. 11 and is a relatively wide spacer unit having an inside diameter the same as the diameter of pipes 64' and 66' and an outside diameter greater than said pipes. The outer perimeter of spacer member 90 is threaded as at 92 and the area of such threads are equally divided by a radially projecting peripheral shoulder 94 which is preferably of a hex configuration or the like to provide a gripping surface for any suitable tightening tool such as a pipe wrench.

Spacer member 90 is disposed intermediate the joinable ends of pipes 64' and 66' as seen in FIG. 10 so that the threaded surface 92 on each side of the shoulder 94 can be threadably engaged by the threads 88 on the compression rings 24'. The opposed faces of member 90 are provided with a plurality of concentrically spaced grooves 96 which are similar in arrangement and purpose as grooves 72 and 72' previously described.

In FIG. 12, the spacer adapter member 98 is similar in purpose and function as member 90 in FIG. 10 but has been adapted for joining two pipe sections 100 and 102 of different diameters. In FIG. 12, the compression ring and gasket units are the same as in FIG. 10 except for size and therefore like parts will be given like numerals as in FIG. 10.

Spacer 98 as best seen in FIG. 13, is a relatively wide washer-type member as spacer 90 and includes a central opening 104 of the same diameter as that of the smaller pipe 102 which is to be joined with the larger diameter pipe 100. The perimeter of spacer 98 in section as seen in FIG. 12 presents a stepped appearance to define the smaller externally threaded neck 106 and the concentrically larger externally threaded neck portion 108. A portion of the perimeter of neck 108 is free of threads and is preferably hex-shaped as at 110 so that spacer 98 may be suitably engaged at this point by a wrench as described in FIG. 10 relative to the shoulder 94. The opposed faces on portions 106 and 108 are provided with grooves 96' corresponding to grooves 96 in FIGS. 10 and 11.

The outer face 112 of spacer 98 extends radially from opening 104 sufficiently so that pipe 100 can be oriented relative thereto as shown in FIG. 12 whereby fitting 22' of an appropriate diameter for pipe 100 can be engaged with the threaded surface of portion 108 on spacer 98. Likewise, a fitting 22' of appropriate diameter for pipe 102 can be suitably mounted on such pipe as described and threadably engaged with the threaded perimeter of spacer portion 106.

In any of the embodiments disclosed herein relative to the joining of two pipe sections, it is noted that the pipes may each be of metal or plastic or may be metal to plastic. Accordingly, in FIG. 10 pipe 64' is represented as plastic and a rigid sleeve such as stainless steel or the like 114 is preferably inserted with the joinable end portion of such plastic pipe and serves to prevent any inward cupping of the pipe when the compression rings are joined together. Preferably, insert 114 has a small peripheral flange 116 for engaging the outer edge of pipe 64' as shown.

It will be appreciated from the foregoing that this pipe connector fitting is a most suitable and convenient means for joining pipe sections together either in their initial construction or for purposes of replacing any given section and that this can be accomplished whether the pipe sections to be joined have fixed flanges or not or whether only one of such sections has a fixed flange. Particularly, where one of the pipe sections to be joined has a fixed flange as of the type shown in FIGS. 3 and 4, for example, the use of the ring 24 considerably simplifies the joining of the pipe since such ring can be rotated to any point desired so that the holes 44 will register with the appropriate holes 46 and 48 in the fixed flanges and thus it is not necessary to maneuver or rotate the pipe itself as is presently required where joinable sections or replacement sections have fixed flange components. It will also be appreciated that where one of the pipes involved is rigidly anchored, a section may be easily joined thereto by this connector fitting without any necessity for disturbing the anchor point. In addition, by the use of the adapter fitting 98, pipes of different diameters can be quickly and easily connected and the pipes to be joined can be metal-to-metal, plastic-to-plastic or metal-to-plastic with equal efficiency.

In the use of this pipe connector fitting in any one of the embodiments disclosed, it is suggested and recommended that some suitable lubricant or antifriction material be preferably used on either one of the matching tapered surfaces of the compression ring or the gasket for the purpose of minimizing and eliminating any possible binding and the use of such material will provide for greater sealing pressure on the pipe barrel. In this regard, the use of a suitable antifriction material as indicated will facilitate the tightening of the compression rings particularly in the embodiments shown in FIGS. 7, 8, 10 and 12 where rotation of the rings is required in securing the pipe ends.

From all of the foregoing, it is thought a full understanding of the construction and operation of this invention will be had and the advantages of the same will be appreciated.

I claim:

1. Apparatus for sealably joining one end of a first pipe to one end of a second pipe, the joinable end of said second pipe having a radially outwardly extending flange, said apparatus comprising:
    a compression ring having a central opening by which it is slip-fitted to the joinable end of said first pipe,
    said ring having a front and rear face,
    a sealing ring gasket slip-fitted to the joinable end of said first pipe so as to abut the front face of said ring,
    means for drawing said ring into securing engagement with said flange whereby said ring acts only against said gasket to urge the same into sealing engagement both with the joinable end of said first pipe and with the flange on said second pipe,
    said gasket being compressible and having a respective front and rear face, and
    said front face on said gasket being tapered toward said rear face so that the forwardmost point on said front face is defined by the point of communication of said central opening with said front face whereby as said ring is joined to said flange, said forwardmost point on said front face is first urged into engagement with said flange and continued securing of said ring to said flange causes said gasket to be compressed into engagement with said pipe and cold flowed toward said flange until all of said front face is engaged therewith.

2. Apparatus as defined in claim 1 including:
    an integral collar on said rear face projecting coaxially from said central opening and journaled on said first pipe,
    at least a portion of the surface of said central opening intermediate said front and rear faces being spaced from the outer surface of said first pipe, and a portion of said gasket being disposed within said central opening so as to engage the edge surface thereof and said first pipe intermediate said front and back faces.

3. Apparatus as defined in claim 1 including:
the surface defining said central opening being tapered from said rear face outwardly to said front face,
said gasket having respective front and rear faces,
the peripheral edge of said gasket being tapered inwardly from the front face thereon to the rear face, and
said ring and gasket mounted on said first pipe so that said tapered peripheral edge nests against the surface of said tapered central opening whereby in the joining of said ring to said flange, the tapered surface of said central opening acts upon the tapered edge of said gasket to urge said gasket into sealing engagement with said first pipe and with the flange on said second pipe.

4. Apparatus as defined in claim 3 wherein in the nesting relationship of said gasket and ring, a portion of said gasket is disposed exteriorally of said central opening toward said flange.

5. Apparatus as defined in claim 1 including:
the flange on said second pipe being provided with spaced apertures for the acceptance of fastening bolts,
said ring having spaced apertures corresponding to and for registration with the apertures on said second pipe, and
bolt means connecting said ring to said flange through said apertures.

6. Apparatus as defined in claim 1 including:
the perimeter of said flange on said second pipe being threaded,
a portion of the central opening adjacent the front face of said ring being concentrically enlarged to define an annular neck, and
said annular neck being internally threaded whereby said ring is attached to said flange by the threaded engagement of said annular neck with the threads on said flange.

7. Apparatus as defined in claim 1 including:
at least one of said pipes being of plastic material, and
a rigid sleeve insert disposed within the joinable end of said plastic pipe.

8. Apparatus fore sealably joining one end of a first pipe to one end of a second pipe, comprising:
a compression ring having a central opening by which a respective ring is slip-fitted to the respective joinable ends of said pipes,
said ring having a front and rear face so that respective front faces are disposed toward each other on the respective joinable pipe ends,
a sealing ring gasket slip-fitted on the respective joinable ends of each pipe so as to abut the respective rings,
a washerlike spacer member concentrically disposed intermediate said joinable pipe ends,
said spacer member being of a larger outer diameter than said pipes to provide a radially projecting flangelike portion having two opposed faces, and
means operable directly between said rings for securing said rings together whereby said gaskets are urged into sealing engagement with the exterior of said pipes at the joinable ends thereof and in sealing engagement with said opposed faces on the projecting portion of said spacer member.

9. Apparatus as defined in claim 8 including:
each ring having an integral collar on the respective rear face projecting coaxially from said respective central opening and journaled on said respective pipes,
at least a portion of the surface of the respective central openings intermediate said front and rear faces being spaced from the outer surface of the respective pipes, and
a portion of the respective gaskets being disposed within the respective central openings so as to engage both the edge surface thereof and said respective pipes intermediate said front and back faces.

10. Apparatus as defined in claim 8 including:
at least one of said pipes being of plastic material, and
a rigid sleeve insert disposed within the joinable end of said plastic pipe.

11. Apparatus as defined in claim 8 including:
each of said rings being provided with a plurality of spaced holes of like arrangement,
bolt and nut means connecting said rings through said holes, and
the perimeter of said spacer member being in sufficiently close proximity to said bolts so that said bolts serve as a stop to prevent any movement of said spacer member transversely of the longitudinal axes of said pipes.

12. Apparatus as defined in claim 8 including:
said central openings being tapered, and
said gaskets having tapered peripheral edges for seating against the respective tapered central openings whereby in the joining of said rings together, the tapered central openings act upon the tapered surfaces of the respective gaskets to urge said gaskets into sealing engagement with said respective pipes and with the respective opposed faces of the projecting portion of said spacer member.

13. Apparatus as defined in claim 8 including:
each of the opposed faces on the projecting portion of said spacer member being provided with a plurality of concentrically spaced grooves, and
said gaskets being of compressible material so that in the joining together of said rings, said gaskets are compressed and cold flowed into engagement within said grooves to enhance the sealing engagement of said gaskets with said spacer member.

14. Apparatus as defined in claim 8 including:
said gaskets being compressible and having a respective front and rear face, and
said front face on said gaskets being tapered toward said rear face so that the forwardmost point on said front face is defined by the point of communication of said central opening with said front face whereby as said rings are joined together, said forwardmost point on said front face is first urged into engagement with a respective face on said spacer member and continued securing of said rings together causes said gaskets to be compressed into engagement with said respective pipes and cold flowed toward the respective opposed faces of said spacer member until all of said respective front faces are engaged therewith.

* * * * *